3,206,460
6-HYDROXY- AND 6-KETO-Δ⁵⁽¹⁰⁾-19-NORANDRO-STENE AND PREGNENE DERIVATIVES

Albert Bowers, Mexico City, Mexico, assignor to Syntex Corporation, Panama, Panama, a corporation of Panama
No Drawing. Filed Nov. 9, 1962, Ser. No. 236,724
Claims priority, application Mexico, Nov. 17, 1961, 65,067
21 Claims. (Cl. 260—239.55)

The present invention relates to novel cyclopentanophenanthrene derivatives and to a process for the production thereof.

More particularly the present invention relates to novel 6-hydroxy and 6-keto-Δ⁵⁽¹⁰⁾-androstene and pregnene derivatives.

The novel compounds of the present invention are represented by the following formulae:

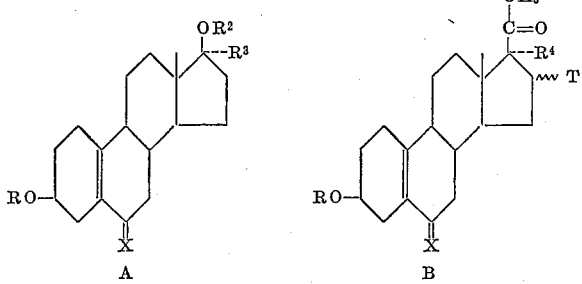

In the above formulae R and R² each represents hydrogen or a hydrocarbon carboxylic acyl group of less than 12 carbon atoms; R³ may be hydrogen, lower alkyl, lower alkenyl or lower alkinyl; X represents a keto group, an α-hydroxyl group or an α-acyloxy group of less than 12 carbon atoms; R⁴ may be hydrogen, a hydroxyl group or a hydrocarbon carboxylic acyloxy group of less than 12 carbon atoms; T may be hydrogen, α or β methyl, α-hydroxyl or α-acyloxy; R⁴ and T together represent the group

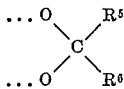

in the 16α, 17α position wherein R⁵ and R⁶ each represents hydrogen or a lower hydrocarbon residue of less than 8 carbon atoms, which may be saturated or unsaturated, of straight, branched, cyclic or cyclic-aliphatic chain, or aromatic, such as methyl, ethyl, vinyl, phenyl, methylphenyl and the like, or a double bond between C–16 and C–17.

The acyl and acyloxy groups are derived from hydrocarbon carboxylic acids containing less than 12 carbon atoms which may be saturated or unsaturated, of straight, branched, cyclic or cyclic-aliphatic chain, or aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel compounds of the present invention represented by the above formula A are anabolic-androgenic agents with a favorable anabolic-androgenic ratio. In addition, they have anti-estrogenic, anti-gonadotrophic, anti-fibrillatory and appetite stimulating properites. Furthermore, they lower the blood cholesterol level, relieve premenstrual tension and suppress the output of the pituitary gland.

The compounds represented by the above formula B are powerful progestational agents with good oral activity. In addition they have anti-androgenic, anti-gonadtrophic and anti-estrogenic properties and are very useful in fertility control. Furthermore, they may be used in the treatment of premenstrual tension and exhibit blood cholesterol lowering and diuretic activities. When applied topically, these compounds are very useful in the treatment of acne.

The novel compounds of the present invention are prepared by the process exemplified by the following equation:

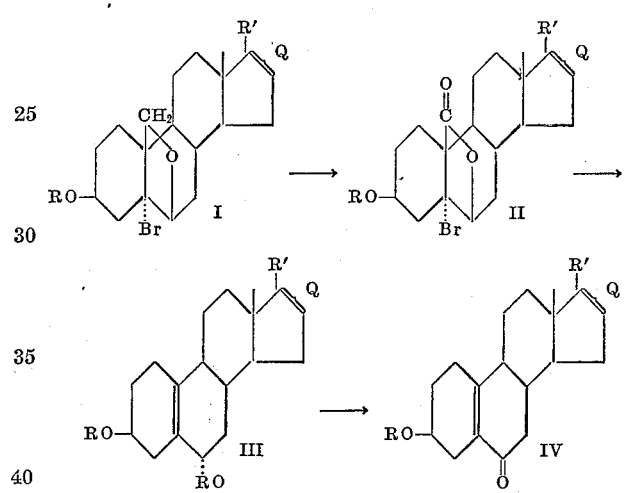

In the above formulae R' represents β-acetyl or β-OR²; Q represents the group:

or the group

R, R², R³, R⁴ and T have the same meaning as set forth hereinbefore.

In proceeding in accordance with the above equation, the starting compound (I) is oxidized, preferably with chromium trioxide in acetic acid or ruthenium tetroxide in carbon tetrachloride thus producing the 6,19-lactone of the corresponding 5α-bromo-6β-hydroxy-19-oic acid (II), which upon treatment with a strong base, such as a concentrated solution of potassium hydroxide in methanol, yields the corresponding 19-nor-Δ⁵⁽¹⁰⁾-6α-hydroxy compound (III; R=H). Upon treatment of the latter compound (III; R=H) with approximately 1 molar equivalent of 2,3-dichloro-5,6-dicyano-1,4-benzoquinone, preferably at room temperature for a period of time of the order of 3 hours, there is obtained the corresponding $\Delta^{5(10)}$-6-keto derivatives (IV).

The compounds of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The compounds of the present invention having a secondary hydroxyl group, for example in C-3 or C-6, are conventionally acylated in pyridine, with a suitable acylating agent such as a chloride or an anhydride of a hydrocarbon carboxylic acid of the type defined hereinbefore, thus affording the corresponding acylates.

The compounds of the present invention having in the molecule a tertiary hydroxyl group, e.g. at C-17, are conventionally esterified in the presence of p-toluenesulfonic acid with an acylating agent, such as acetic anhydride, caproic anhydride, cyclopentylpropionic anhydride or enanthic anhydride, to produce the corresponding esters.

The following specific examples serve to illustrate but are not intended to limit the scope of the present invention:

PREPARATION 1

There were suspended 10 g. of the diacetate of $\Delta^5$-androstene-3β,17β-diol in 100 cc. of dioxane, 12 cc. of 0.46 N perchloric acid were added and then 4 g. of N-bromoacetamide; the N-bromoacetamide was added little by little, stirring over the period of 1 hour, in the absence of light and at a temperature of about 15° C. Stirring was continued for 1 hour in darkness and at room temperature. The mixture was then decolorized by addition of a 10% aqueous sodium bisulfite solution, there was then added 1 liter of water and the mixture was extracted with methylene chloride; the extract was washed with water, dried over anhydrous sodium sulfate and the solvent was evaporated, under reduced pressure and at room temperature, thus giving 5α-bromo-androstane-3β,6β,17β-triol 3,17-diacetate.

Following the same technique, there were treated the compounds under I, thus affording the products under II.

| I | II |
| --- | --- |
| Acetate of pregnenelone | 3-acetate of 5α-bromopregnane-3β,6β-diol-20-one. |
| Acetate of $\Delta^{5,16}$-pregnadien-3β-ol-20-one. | 3-acetate of 5α-bromo-$\Delta^{16}$-pregnene-3β,6β-diol-20-one. |

PREPARATION 2

To a solution of 4 g. of the 3,17-diacetate of 5α-bromo-androstane-3β,6β,17β-triol in 150 cc. of dry benzene, were added 6 g. of lead tetraacetate and the mixture was refluxed for 18 hours. It was cooled, filtered, water was added to the filtrate, the benzene layer was separated, washed with water and the benzene was evaporated under reduced pressure; upon chromatography of the residue on neutral alumina, there was obtained the diacetate of 5α-bromo-6β,19-oxido androstane-3β,17β-diol.

The compounds under I were treated in the same manner, thus giving the products under II.

| I | II |
| --- | --- |
| 3-acetate of 5α-bromopregnane-3β,6β-diol-20-one. | 3-acetate of 5α-bromo-6β,19-oxido-pregnan-3β-ol-20-one. |
| 3-acetate of 5α-bromo-$\Delta^{16}$-pregnene-3β,6β-diol-20-one | 3-acetate of 5α-bromo-6β,19-oxido-$\Delta^{16}$-pregnen-3β-ol-20-one. |

PREPARATION 3

The known compound, 3β,17α-diacetoxy-$\Delta^5$-pregnen-20-one, was successively treated according to preparations 1 and 2 giving respectively: the 3,17-diacetate of 5α-bromo-pregnane-3β,6β,17α-triol-20-one and the 3,17-diacetate of 5α-bromo-6β,19-oxido-pregnane-3β,17α-diol-20-one.

PREPARATION 4

The known compound, the acetate of 16α-methyl-$\Delta^5$-pregnen-3β-ol-20-one, was treated according to Preparation 1 and 2, giving consecutively: the 3-acetate of 16α-methyl-5α-bromo-pregnane-3β,6β-diol-20-one and the 3-acetate of 16α-methyl-5α-bromo-6β,19-oxido-pregnan-3β-ol-20-one.

PREPARATION 5

The acetate of 16β-methyl-$\Delta^5$-pregnen-3β-ol-20-one, obtained by conventional acetylation of the known compound, 16β-methyl-$\Delta^5$-pregnen-3β-ol-20-one, in pyridine with acetic anhydride, was treated according to Preparations 1 and 2 giving successively: the 3-acetate of 16β-methyl-5α-bromo-pregnane-3β,6β-diol-20-one and the 3-acetate of 16β-methyl-5α-bromo-6β,19-oxido-pregnan-3β-ol-20-one.

PREPARATION 6

The diacetate of 16α-methyl-$\Delta^5$-pregnene-3β,17α-diol-20-one, which is a known compound, was treated according to Preparations 1 and 2, giving successively; 3,17-diacetate of 16α-methyl-5α-bromo-pregnane-3β,6β,17α-triol-20-one and the 3,17-diacetate of 16α-methyl-5α-bromo-6β,19-oxido-pregnane-3β,17α-diol-20-one.

PREPARATION 7

16α,17α-isopropylidenedioxy - $\Delta^5$-pregnen - 3β-ol-20-one (G. Cooley et al., J. Chem. Soc. 4377 (1955)) was conventionally acetylated in pyridine with acetic anhydride, thus giving the corresponding 3-acetate, which was treated according to Preparations 1 and 2, giving successively: the 3-acetate of 16α,17α-isopropylidenedioxy-5α-bromo-pregnane-3β,6β-diol-20-one and the 3-acetate of 16α,17α-isopropylidenedioxy - 5α-bromo - 6β,19-oxido-pregnan-3β-ol-20-one.

PREPARATION 8

The acetate of $\Delta^5$-androsten-3β-ol-17-one was treated according to Preparations 1 and 2, giving successively: the acetate of 5α-bromo-androstane-3β,6β-diol-17-one and the acetate of 5α-bromo-6β,19-oxido-androstan-3β-ol-17-one.

PREPARATION 9

A solution of 5 g. of the acetate of 5α-bromo-6β,19-oxido-androstan-3β-ol-17-one, in 250 cc. of thiophene-free benzene was treated with 27.5 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded the 3-acetate of 17α-methyl-5α-bromo-6β,19-oxido-androstane-3β,17β-diol.

PREPARATION 10

A solution of 1 g. of the acetate of 5α-bromo-6β,19-oxido-androstan-3β-ol-17-one in 30 cc. of anhydrous ben- 33. 19-nor-Δ⁵⁽¹⁰⁾-androsten-3β-ol-6,17-dione
34. 17α-methyl-19-nor-Δ⁵⁽¹⁰⁾-androstene-3β,17β-diol-6-one
35. 17α-vinyl-19-nor-Δ⁵⁽¹⁰⁾-androstene-3β,17β-diol-6-one
36. 17α-ethinyl-19-nor-Δ⁽¹⁰⁾-androstene-3β,17β-diol-6-one

*Example IV*

A mixture of 1 g. of Compound No. 13, 4 cc. of pyridine and 2 cc. of acetic anhydride was kept at room temperature overnight, poured into ice water, the formed precipitate was filtered, washed with water and dried. Crystallization from acetone-hexane gave 19-nor-Δ⁵⁽¹⁰⁾-androstene-3β,6α,17β-triol triacetate (Cpd. No. 37).

The Compounds Nos. 14 to 36, inclusive, were treated according to the same procedure, thus yielding respectively:

Cpd. No.—
38. 19-nor-Δ⁵⁽¹⁰⁾-pregnene-3β,6α-diol-20-one diacetate
39. 19-nor-Δ⁵⁽¹⁰⁾,¹⁶-pregnadiene-3β,6α-diol-20-one diacetate
40. 19-nor-Δ⁵⁽¹⁰⁾-pregnene-3β,6α,17α-triol-20-one 3,6-diacetate
41. 16α-methyl-19-nor-Δ⁵⁽¹⁰⁾-pregnene-3β,6α-diol-20-one diacetate
42. 16β-methyl-19-nor-Δ⁵⁽¹⁰⁾-pregnene-3β,6α-diol-20-one diacetate
43. 16α-methyl-19-nor-Δ⁵⁽¹⁰⁾-pregnene-3β,6α,17α-triol-20-one-3,6-diacetate
44. 16α,17α-isoproplyidenedioxy-19-nor-Δ⁵⁽¹⁰⁾-pregnene-3β,6α-diol-20-one diacetate
45. 19-nor-Δ⁵⁽¹⁰⁾-androstene-3β,6α-diol-17-one diacetate
46. 17α-methyl-19-nor-Δ⁵⁽¹⁰⁾-androstene-3β,6α,17β-triol 3,6-diacetate
47. 17α-vinyl-19-nor-Δ⁵⁽¹⁰⁾-androstene-3β,6α-17β-triol 3,6-diacetate
48. 17α-ethinyl-19-nor-Δ⁵⁽¹⁰⁾-androstene-3β,6α,17β-triol 3,6-diacetate
49. 19-nor-Δ⁵⁽¹⁰⁾-androstene-3β,17β-diol-6-one diacetate
50. 19-nor-Δ⁵⁽¹⁰⁾-pregnen-3β-ol-6,20-dione acetate
51. 19-nor-Δ⁵⁽¹⁰⁾,¹⁶-pregnadien-3β-ol-6,20-dione acetate
52. 19-nor-Δ⁵⁽¹⁰⁾-pregnene-3β,17α-diol-6,20-dione 3-acetate
53. 16α-methyl-19-nor-Δ⁵⁽¹⁰⁾-pregnen-3β-ol-6,20-dione acetate
54. 16β-methyl-19-nor-Δ⁵⁽¹⁰⁾-pregnen-3β-ol-6,20-dione acetate
55. 16α-methyl-19-nor-Δ⁵⁽¹⁰⁾-pregnene-3β,17α-diol-6,20-dione 3-acetate
56. 16α,17α-isopropylidenedioxy-91-nor-Δ⁵⁽¹⁰⁾-3β-ol-6,20-dione acetate
57. 19-nor-Δ⁵⁽¹⁰⁾-androsten-3β-ol-6,17-dione acetate
58. 17α-methyl-19-nor-Δ⁵⁽¹⁰⁾-androstene-3β,17β-diol-6-one 3-acetate
59. 17α-vinyl-19-nor-Δ⁵⁽¹⁰⁾-androstene-3β,17β-diol-6-one 3-acetate
60. 17α-ethinyl-19-nor-Δ⁵⁽¹⁰⁾-androstene-3β,17β-diol-6-one 3-acetate

*Example V*

The starting compounds of Example IV were treated following exactly the procedure described in that example, except that acetic anhydride, was substituted by caproic anhydride, enanthic anhydride and cyclopentylpropionic anhydride thus affording respectively the corresponding caproates, propionates, enanthates and cyclopentylpropionates of said starting compounds.

*Example VI*

To a solution of 5 g. of Compound No. 16 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 19-nor-Δ⁵⁽¹⁰⁾-pregnene-3β,6α,17α-triol-20-one tricaproate (Cpd. No. 61).

The Compounds Nos. 19, 22, 23, 24, 28, 31, 34, 35 and 36, were treated by the same procedure, thus yielding respectively:

Cpd. No.—
62. 16α-methyl-19-nor-Δ⁵⁽¹⁰⁾-pregnene-3β,6α,17α-triol-20-one tricaproate,
63. 17α-methyl-19-nor-Δ⁵⁽¹⁰⁾-androstene-3β,6α,17β-triol-tricaproate,
64. 17α-vinyl-19-nor-Δ⁵⁽¹⁰⁾-androstene-3β,6α,17β-triol tricaproate,
65. 17α-ethinyl-19-nor-Δ⁵⁽¹⁰⁾-androstene-3β,6α,17β-triol tricaproate,
66. 19-nor-Δ⁵⁽¹⁰⁾-pregnene-3β,17α-diol-6,20-dione dicaproate,
67. 16α-methyl-19-nor-Δ⁵⁽¹⁰⁾-pregnene-3β,17α-diol-6,20-dione dicaproate,
68. 17α-methyl-19-nor-Δ⁵⁽¹⁰⁾-androstene-3β,17β-diol-6-one dicaproate,
69. 17α-vinyl-19-nor-Δ⁵⁽¹⁰⁾-androstene-3β,17β-diol-6-one dicaproate,
70. 17α-ethinyl-19-nor-Δ⁵⁽¹⁰⁾-androstene-3β,17β-diol-6-one dicaproate.

*Example VII*

The starting compounds of Example VI were treated following exactly the procedure described in that example, except that caproic anhydride was substituted by acetic anhydride, propionic anhydride, enanthic anhydride and cyclopentylpropionic anhydride thus affording respectively the corresponding acetates, propionates, enanthates, and cyclopentylpropionates of said starting compounds.

*Example VIII*

2 g. of Compound No. 61 was dissolved in 50 cc. of methanol and treated with 5 cc. of a 4% aqueous solution of potassium hydroxide; the reaction mixture was stirred for 2 hours under an atmosphere of nitrogen at 10° C.; the mixture was neutralized with acetic acid and the methanol distilled under reduced pressure. The residue was triturated with water and the solid collected, washed with water, dried and recrystallized from ethyl acetate-methanol, thus producing 19-nor-Δ⁵⁽¹⁰⁾-pregnene-3β,6α,17α-triol-20-one 17-caproate (Cpd. No. 71).

By the same procedure there was treated Compound No. 66, thus giving 19-nor-Δ⁵⁽¹⁰⁾-pregnene-3β,17α-diol-6,20-dione 17-caproate (Cpd. No. 72).

*Example IX*

1 g. of Compound No. 20 was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 19-nor-Δ⁵⁽¹⁰⁾-pregnene-3β,6α,16α,17α-tetrol-20-one (Cpd. No. 73).

By the same procedure, Compound No. 32 was transformed into 19-nor-Δ⁵⁽¹⁰⁾-pregnene-3β,16α,17α-triol-6,20-dione (Cpd. No. 74).

*Example X*

The Compounds Nos. 73 and 74 were treated according to Example IV, thus affording respectively: 19-nor-Δ⁵⁽¹⁰⁾-pregnene-3β,6α,16α,17α-tetrol-20-one 3,6,16-triacetate zene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the 3-acetate of 17α-ethinyl-5α-bromo-6β,19-oxido-androstane-3β,17β-diol.

PREPARATION 11

A solution of 1 g. of the 3-acetate of 17-ethinyl-5α-bromo-6β,19-oxido-androstane-3β,17β-diol in 40 cc. of pyridine was hydrogenated at 25° C. and 570 mm. in the presence of 400 mg. of pre-hydrogenated 2% palladium calcium carbonate catalyst.

When 1.1 molar equivalent of hydrogen had been absorbed, the reaction was stopped, the catalyst separated by filtration through celite, washed with ethyl acetate and the combined solutions evaporated to dryness in vacuo, yielding the crude vinyl derivative. This crude product was dissolved in ethyl acetate, the organic solution washed with dilute hydrochloric acid and water to neutral, dried and evaporated to dryness. Recrystallization from acetone gave the 3-acetate of 17α-vinyl-5α-bromo-6β,19-oxido-androstane-3β,17β-diol.

*Example I*

To a solution of 2.5 g. of the diacetate of 5α-bromo-6β,19-oxido-androstane-3β,17β-diol in 50 cc. of acetic acid were added 2.5 g. of chromium trioxide dissolved in 100 cc. of 90% acetic acid, little by little, stirring and at a temperature of about 20° C. It was then kept at this temperature during 24 hours, the product was finally precipitated by addition of ice water and was filtered. By recrystallization from acetone-hexane, there was obtained the 6,19-lactone of the 3β,17β-diacetoxy-5α-bromo-androstan-6β-ol-19-oic acid (Compound No. 1).

In the same manner there were treated the starting compounds under I, thus giving the products under II.

| I | Cpd. No. | II |
|---|---|---|
| 3-acetate of 5α-bromo-6β,19-oxido-pregnan-3β-ol-20-one. | 2 | 6,19-lactone of the 3β-acetoxy-5α-bromo-pregnan-6β-ol-20-one-19-oic-acid. |
| 3-acetate of 5α-bromo-6β,19-oxido-Δ16-pregnen-3β-ol-20-one. | 3 | 6,19-lactone of the 3β-acetoxy-5α-bromo-Δ16-pregnen-6β-ol-20-one-19-oic-acid. |
| 3,17-diacetate of 5α-bromo-6β,19-oxido-3β,17α-diol-20-one. | 4 | 6,19-lactone of the 3β,17α-diacetoxy-5α-bromo-pregnan-6β-ol-20-one-19-oic-acid. |
| 3-acetate of 16α-methyl-5α-bromo-6β,19-oxido-pregnan-3β-ol-20-one. | 5 | 6,19-lactone of the 3β-acetoxy-16α-methyl-5α-bromo-pregnan-6β-ol-20-one-19-oic-acid. |
| 3-acetate of 16β-methyl-5α-bromo-6β,19-oxido-pregnan-3β-ol-20-one. | 6 | 6,19-lactone of the 3β-acetoxy-16β-methyl-5α-bromo-pregnan-6β-ol-20-one-19-oic-acid. |
| 3,17-diacetate of 16α-methyl-5α-bromo-6β,19-oxido-pregnane-3β,17α-diol-20-one. | 7 | 6,19-lactone of the 3β,17α-diacetoxy-16α-methyl-5α-bromo-pregnan-6β-ol-20-one-19-oic-acid. |
| 3-acetate of 16α,17α-isopropylidenedioxy-5α-bromo-6β,19-oxido-pregnan-3β-ol-20-one. | 8 | 6,19-lactone of the 3β-acetoxy-16α,17α-isopropylidenedioxy-5α-bromo-pregnan-6β-ol-20-one-19-oic-acid. |
| acetate of 5α-bromo-6β,19-oxido-androstan-3β-ol-17-one. | 9 | 6,19-lactone of 3β-acetoxy-5α-bromo-androstan-6β-ol-17-one-19-oic-acid. |
| 3-acetate of 17α-methyl-5α-bromo-6β,19-oxido-androstane-3β,17β-diol. | 10 | 6,19-lactone of 3β-acetoxy-17α-methyl-5α-bromo-androstane-6β,17β-diol-19-oic-acid. |
| 3-acetate of 17α-vinyl-5α-bromo-6β,19-oxido-androstane-3β,17β-diol. | 11 | 6,19-lactone of 3β-acetoxy-17α-vinyl-5α-bromo-androstane-6β,17β-diol-19-oic-acid. |
| 3-acetate of 17α-ethinyl-5α-bromo-6β,19-oxido-androstane-3β,17β-diol. | 12 | 6,19-lactone of 3β-acetoxy-17α-ethinyl-5α-bromo-androstane-6β,17β-diol-19-oic-acid. |

A solution of 2 g. of the diacetate of 5α-bromo-6β,19-oxido-androstane-3β,17β-diol in 50 cc. of carbon tetrachloride, was cooled to 10–15° C. and there was added a solution of 1.5 g. of ruthenium tetroxide (prepared according to Berkowitz et al., J. Am. Chem. Soc. 80, 6682 (1958)) in 10 cc. of carbon tetrachloride. The resulting mixture was left standing overnight. The formed precipitate of ruthenium dioxide was filtered and washed abundantly with carbon tetrachloride. The organic solutions were combined and evaporated to dryness. Upon crystallization of the residue from acetone-hexane, there was obtained the 6,19-lactone of 3β,17β-diacetoxy-5α-bromo-androstan-6β-ol-19-oic acid (Cpd. No. 1).

The starting compounds previously set forth were treated by the latter method, giving products identical with those obtained by the first procedure.

*Example II*

A solution of 1 g. of the 6,19-lactone of the 3β-17β-diacetoxy-5α-bromo-androstan-6β-ol-19-oic acid (Cpd. No. 1) in 50 cc. of methanol was refluxed for 1 hour with 2.5 g. of potassium hydroxide dissolved in 1 cc. of water; it was poured into ice water and acidified slightly with dilute hydrochloric acid the precipitate collected, washed with water to neutral and dried, thus producing a crude compound which upon recrystallization from methylenechloride-ether afforded 19-nor-$\Delta^{5(10)}$-androstene-3β,6α,17β-triol (Cpd. No. 13).

When treating the compounds Nos. 2 to 12, inclusive, by the above procedure, there were obtained respectively:

Cpd. No.—
14. 19-nor-$\Delta^{5(10)}$-pregnene-3β,6α-diol-20-one
15. 19-nor-$\Delta^{5(10),16}$-pregnadiene-3β,6α-diol-20-one
16. 19-nor-$\Delta^{5(10)}$-pregnene-3β,6α,17α-triol-20-one
17. 16α-methyl-19-nor-$\Delta^{5(10)}$-pregnene-3β,6α-diol-20-one
18. 16β-methyl-19-nor-$\Delta^{5(10)}$-pregnene-3β,6α-diol-20-one
19. 16α-methyl-19-nor-$\Delta^{5(10)}$-pregnene-3β,6α,17α-triol-20-one
20. 16α,17α-isopropylidenedioxy-19-nor-$\Delta^{5(10)}$-pregnene-3β,6α-diol-20-one
21. 19-nor-$\Delta^{5(10)}$-androstene-3β,6α-diol-17-one
22. 17α-methyl-19-nor-$\Delta^{5(10)}$-androstene-3β,6α,17β-triol
23. 17α-vinyl-19-nor-$\Delta^{5(10)}$-androstene-3β,6α,17β-triol
24. 17α-ethinyl-19-nor-$\Delta^{5(10)}$-androstene-3β,6α,17β-triol

*Example III*

A mixture of 1 g. of 19-nor-$\Delta^{5(10)}$-androstene-3β,6α,17β-triol (Cpd. No. 13) in 20 cc. of dioxane, and 1.1 molar equivalents of 2,3-dichloro, 5,6-dicyano 1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave 19-nor-$\Delta^{5(10)}$-androstene-3β,17β-diol-6-one (Cpd. No. 25).

In the same manner there were treated the compounds Nos. 14 to 24, inclusive, thus yielding respectively:

Cpd. No.—
26. 19-nor-$\Delta^{5(10)}$-pregnen-3β-ol-6,20-dione
27. 19-nor-$\Delta^{5(10),16}$-pregnadien-3β-ol-6,20-dione
28. 19-nor-$\Delta^{5(10)}$-pregnene-3β,17α-diol-6,20-dione
29. 16α-methyl-19-nor-$\Delta^{5(10)}$-pregnen-3β-ol-6,20-dione
30. 16β-methyl-19-nor-$\Delta^{5(10)}$-pregnen-3β-ol-6,20-dione
31. 16α-methyl-19-nor-$\Delta^{5(10)}$-pregnene-3β,17α-diol-6,20-dione
32. 16α,17α-isopropylidenedioxy-19-nor-$\Delta^{5(10)}$-pregnen-3β-ol-6,20-dione (Cpd. No. 75) and 19-nor-$\Delta^{5(10)}$-pregnene-3$\beta$,16$\alpha$,17$\alpha$-triol-6,20-dione 3,16-diacetate (Cpd. No. 76).

I claim:

1. A compound of the following formula:

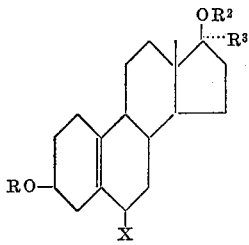

wherein R and $R^2$ are selected from the group consisting of hydrogen and a hydrocarbon carboxylic acyl group of less than 12 carbon atoms; $R^3$ is selected from the group consisting of hydrogen, lower alkyl, lower alkenyl and lower alkynyl, and X is selected from the group consisting of a keto group, an $\alpha$-hydroxyl group and an $\alpha$-hydrocarbon carboxylic acyloxy group of less than 12 carbon atoms.

2. A compound of the following formula:

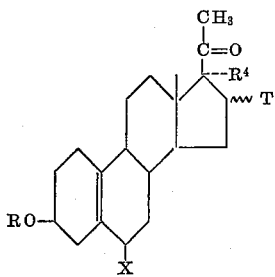

wherein R is selected from the group consisting of hydrogen and a hydrocarbon carboxylic acyl group of less than 12 carbon atoms; X is selected from the group consisting of a keto group, an $\alpha$-hydroxyl group and an $\alpha$-hydrocarbon carboxylic acyloxy group of less than 12 carbon atoms; $R^4$ is a member of the group consisting of hydrogen, a hydroxyl group and a hydrocarbon carboxylic acyloxy group of less than 12 carbon atoms; T is a member of the group consisting of hydrogen, $\alpha$-methyl, $\beta$-methyl, $\alpha$-hydroxyl and an $\alpha$-hydrocarbon carboxylic acyloxy group of less than 12 carbon atoms; $R^4$ and T taken together are selected from the group consisting of a double bond between C–16 and C–17 and the group

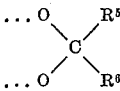

in the 16$\alpha$, 17$\alpha$-position wherein $R^5$ and $R^6$ are selected from the group consisting of hydrogen and a lower hydrocarbon residue of less than 8 carbon atoms.

3. 19-nor-$\Delta^{5(10)}$-androstene-3$\beta$,17$\beta$-diol-6-one.
4. 19-nor-$\Delta^{5(10),16}$-pregnadien-3$\beta$-ol-6,20-dione.
5. 19-nor-$\Delta^{5(10)}$-pregnen-3$\beta$,17$\alpha$-diol-6,20-dione.
6. 16$\alpha$-methyl-19-nor-$\Delta^{5(10)}$-pregnen-3$\beta$-ol-6,20-dione.
7. 16$\beta$-methyl-19-nor-$\Delta^{5(10)}$-pregnen-3$\beta$-ol-6,20-dione.
8. 16$\alpha$ - methyl-19-nor - $\Delta^{5(10)}$-pregnene-3$\beta$,17$\alpha$-diol-6,20-dione.
9. 16$\alpha$,17$\alpha$ - isopropylidenedioxy-19-nor-$\Delta^{5(10)}$-pregnen-3$\beta$-ol-6,20-dione.
10. 19-nor-$\Delta^{5(10)}$-androsten-3$\beta$-ol-6,17-dione.
11. 17$\alpha$ - methyl-19-nor-$\Delta^{5(10)}$-androstene-3$\beta$,17$\beta$-diol-6-one.
12. 17$\alpha$ - vinyl - 19-nor-$\Delta^{5(10)}$-androstene-3$\beta$,17$\beta$-diol-6-one.
13. 17$\alpha$ - ethinyl-19-nor-$\Delta^{5(10)}$-androstene-3$\beta$,17$\beta$-diol-6-one.
14. 19-nor-$\Delta^{5(10)}$-androstene-3$\beta$,6$\alpha$,17$\beta$-triol.
15. 19-nor-$\Delta^{5(10)}$-pregnene-3$\beta$,6$\alpha$-diol-20-one.
16. 19-nor-$\Delta^{5(10),16}$-pregnadiene-3$\beta$,6$\alpha$-diol-20-one.
17. 19-nor-$\Delta^{5(10)}$-pregnene-3$\beta$,6$\alpha$,17$\alpha$-triol-20-one.
18. 16$\alpha$ - methyl - 19-nor-$\Delta^{5(10)}$-pregnene-3$\beta$,6$\alpha$-diol-20-one.
19. 16$\beta$ - methyl - 19-nor-$\Delta^{5(10)}$-pregnene-3$\beta$,6$\alpha$-diol-20-one.
20. 16$\alpha$ - methyl - 19-nor-$\Delta^{5(10)}$-pregnene-3$\beta$,6$\alpha$,17$\alpha$-triol-20-one.
21. 16$\alpha$,17$\alpha$ - isopropylidenedioxy-19-nor-$\Delta^{5(10)}$-pregnene-3$\beta$,6$\alpha$-diol-20-one.

References Cited by the Examiner

UNITED STATES PATENTS 3,004,045  10/61  Zeelen _____ 260—397.4

LEWIS GOTTS, *Primary Examiner.*